March 23, 1965 J. N. SALTER 3,174,716

MAGNETOSTRICTIVE MULTIPLIER DEVICE

Filed Oct. 15, 1962

INVENTOR.
JACK N. SALTER

BY

Hauke + Hauke

ATTORNEYS

United States Patent Office 3,174,716 Patented Mar. 23, 1965

3,174,716
MAGNETOSTRICTIVE MULTIPLIER DEVICE
Jack Nelson Salter, 230 Victory Drive, Pontiac, Mich.
Filed Oct. 15, 1962, Ser. No. 230,394
4 Claims. (Cl. 251—129)

The present invention relates to magnetostrictive devices and more particularly to a means of multiplying the changes in dimensions of the ferromagnetic displacement member of such devices.

Magnetostriction refers to the changes in dimensions produced in ferromagnetic materials when these are placed in a magnetic field. The best known and most widely used of the ferromagnetic elements are nickel, iron, vanadium and cobalt. Heretofore commercial use of this phenomena has been largely limited to devices utilizing the inverse or Villari effect. This effect relates to the fact that magnetization of ferromagnetic material is altered upon the application of external stresses to the material. Using this effect strain gages and other similar devices have been developed. The use of magnetostrictive devices as a motoring means has been limited for a number of reasons. First, the rate of change in the dimensions of the ferromagnetic material is not constant and varies as the material approaches its saturation point. Secondly, the change is very small with respect to its length. For a nickel rod one foot long, for instance, the change at saturation would be about 3.6 ten thousandths of an inch. The instant response produced by magnetizing the ferromagnetic materials makes magnetostrictive motoring devices highly desirable in computer systems and the like if these disadvantages can be overcome.

It is an object then of the present invention to increase the use of magnetostrictive devices by providing a means of multiplying the dimensional changes of the ferromagnetic displacement member of such devices.

It is still another object of the present invention to provide a magnetostrictive motoring device in which the changes produced by the device have a substantially linear relationship with the current producing the magnetic field by providing means compensating for changes in the rate at which the dimensions of the ferromagnetic displacement member will vary as the member approaches its saturation point.

It is yet another object of the present invention to provide a simply constructed motor device which will respond instantly to an electrical signal by providing a ferromagnetic displacement member, means for magnetizing said member and means amplifying the changes produced in the magnetized displacement member.

Figure 1:
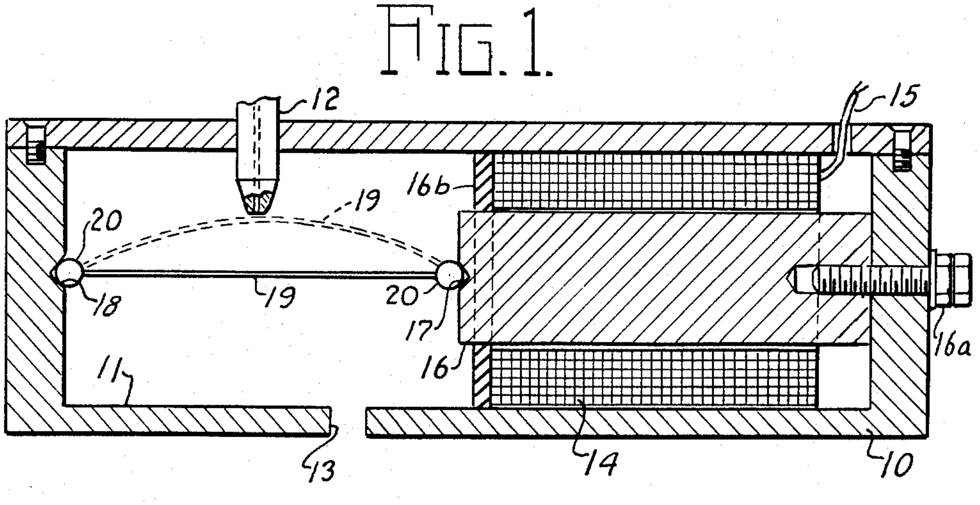
Figure 2:
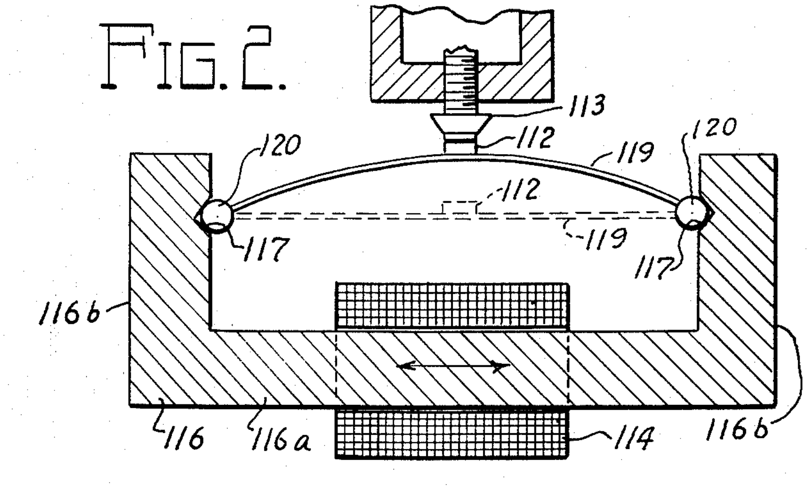
Figure 3:
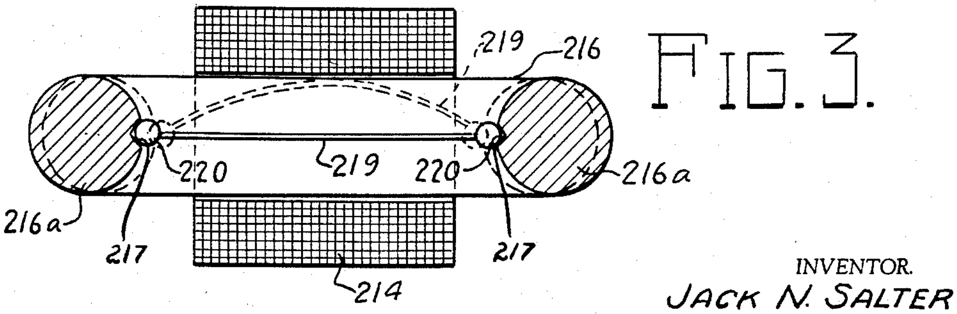

Other objects and advantages will readily occur to one skilled in the art to which the invention pertains upon reference to the following drawings in which like reference characters refer to like parts throughout the several views and in which FIG. 1 is a diagrammatic view of a preferred embodiment of the present invention illustrating a preferred use, FIG. 2 is a diagrammatic view of yet another preferred embodiment of the present invention illustrating another preferred use, and FIG. 3 is a diagrammatic view of still another preferred motoring device of the present invention.

Now referring to the drawings for a more detailed description of the present invention, FIG. 1 illustrates a preferred motoring device as comprising a housing 10 having a chamber 11. A nozzle 12 is adapted for connection to a source of fluid pressure (not shown) and opens to the chamber 11. The chamber 11 is preferably vented to the atmosphere as at 13. An electromagnetic coil 14 is carried in the housing 10 and is adapted for connection to a source of electrical energy (not shown) by leads 15.

The coil 14 encompasses an elongated magnetostrictive displacement member 16 which is fixed at one end to the housing 10 by a bolt 16*a*. A seal 16*b* prevents fluid leakage to the coil 14. A conical recess 17 is provided in the end of the magnetostrictive displacement member 16 which faces the chamber 11 and a similar conical recess 18 is provided in the housing 10 in axial alignment with the recess 17. An elongated resilient bow spring member 19 is preferably provided with spherical shaped end portions 20 which engage in the recesses 17–18 and retain the bow spring member in a position between the housing 10 and the magnetostrictive member 16.

Although it has been preferred to described the end portions 20 as being spherical it is apparent that these could also be in the shape of cylinders having their longitudinal axes normal to the longitudinal axes of the bow spring member 19. In this construction of the bow spring member 19 the receses 17–18 would be in the form of elongated V-shaped grooves.

Ferromagnetic metals and alloys differ both as to magnitude and sign of magnetostriction. Iron for instance expands in a field of low intensity and contracts slightly in a field of high intensity. Nickel shows a positive magnetostriction in all magnetic fields. By utilizing alloys of these metals, it is possible to produce a wide range of magnetostrictive properties. In the device illustrated in FIG. 1, it is assumed that the ferromagnetic displacement member 16 is constructed of a material having a positive magnetostriction characteristic in all magnetic fields although it is apparent that a negative magnetostrictive member 16 could be used with only slight modifications in the construction of the device being necessary.

As the coil 14 is energized to produce a magnetic field the member 16 will expand exerting an axial force against the spherical end portion 20 of the bow spring member 19 carried in the recess 17. This will cause the bow spring member 19 to move toward the arcuate or bowed position illustrated by dotted lines in FIG. 1.

It is apparent that by appropriate construction the bow spring member 19 can be made to flex in the direction desired. This can also be produced by flexing the spring member 19 slightly in its deenergized position or by providing an abutment which permits flexing in a single direction. In the device illustrated in FIG. 1 the movement produced in the bow spring member 19 is used to variably restrict the orifice of the nozzle 12 although it is apparent that other uses can be made of this device. Lateral displacement of such a bow spring is not linear with respect to axial movement, so by selecting suitable dimensions and materials for the bow spring member 19 and the displacement member 16 a substantially linear relationship between the current energizing the coil 14 and the movement of the bow spring member 19 can be produced. The fact that ferromagnetic materials change dimensions at a slower rate as the material reaches its saturation point has made magnetostrictive motoring devices unsatisfactory where a substantially linear relationship is desirable and the combination of the present invention overcomes this inherent disadvantage of such devices.

Further the bow spring memebr 19 amplifies the relatively small dimensional changes which are produced in the displacement member 16 and thus provides a means of putting these changes to practical use.

FIG. 2 illustrates diagrammatically another preferred embodiment of the present invention in which a substantially C shaped ferromagnetic displacement member 116 is used. An electromagnetic coil 114 encompasses a medial portion 116 so that energizing the coil 114 produces a change in the distance between arm portions 116*b* of the displacement member 116. A bow spring member 119 is carried in conical recesses 117 provided in the arm portions 116*b*. The bow spring member 119 is preferably provided with spherical end portions 120 engaging in the recesses 117.

The embodiment illustrated in FIG. 2 is intended for use as an electrical switch although it is apparent that other uses can be made of the motoring device shown. A contact 112 is carried on the bow spring member 119 in a position to engage and disengage from a contact member 113 as movement in the bow spring member 119 is produced. It is apparent that if it is desired to construct a normally closed switch, the displacement member 116 will be of a positive magnetostrictive material and the bow spring member 119 will be somewhat longer than the distance between the arm portions 116*b* so that it will assume the bowed or arcuate position illustrated in solid lines when it is snapped into the recesses 117. Then when the coil 114 is energized causing the displacement member 116 to expand, the distance between the arm portions 116*b* will increase, causing the bow spring member 119 to move toward the dotted position shown in FIG. 2 and breaking contact between the contacts 112–113 to open the switch.

If it is desired to construct a normally open switch the displacement member 116 will be of a negative magnetostrictive material. The bow spring member 119 will normally assume the position shown in dotted lines and will move toward the solid line position as the coil 114 is energized, causing the displacement member 116 to contract.

FIG. 3 illustrates another preferred motoring device of the present invention in which a ferromagnetic displacement member 216 is constructed in the shape of a torus. A bow spring member 219 is provided with spherical end portions 220 which engage in conical recesses 217 provided in the end portions 216*a* of the displacement member 216. An electromagnetic coil 214 encompasses a medial portion 216*b* of the displacement member 216. As the coil 214 is energized, the length of the torus shaped displacement member 216 will increase or decrease depending upon whether a positive or negative magnetostrictive material is used. This will cause the distance between the arm portions 216 to vary causing a change in the position of the bow spring member 219.

It is apparent that other types of diaphragms or the like could be used in place of the bow spring members described without departing from the spirit of the invention.

Although I have described but three embodiments of the present invention, it is apparent that many changes and modifications can be made without departing from the spirit of the invention or the scope of the appended claims.

I claim:

1. In combination
   (*a*) a housing defining a fluid chamber and a pressure port communicating with said fluid chamber,
   (*b*) a ferromagnetic displacement member carried in said housing,
   (*c*) means selectively operable to magnetize said displacement member,
   (*d*) an elongated resilient bow spring member carried in said fluid chamber in a normally straight position on an axis substantially normal to and coplanar with the axis of said pressure port,
   (*e*) means fixing the ends of said resilient bow spring member and at least one of said ends being operably connected to said displacement member whereby as magnetic force is applied to said displacement member dimensional changes produced in said displacement member will vary the space between said ends and urge said resilient bow spring member to an arcuate position,
   (*f*) said pressure port being disposed in a position to be engaged by said bow spring member when same is in its arcuate position whereby as said displacement member is magnetized causing said bow spring member to move to its arcuate position said pressure port is variably restricted.

2. The combination as defined in claim 1 and in which said bow spring end fixing means comprises,
   (*a*) a spherical portion being provided in each of the ends of said bow spring member, and
   (*b*) said displacement member and said housing each being provided with a conical recess respectively receiving one of said spherical end portions.

3. The combination as defined in claim 1 and in which said magnetizing means comprises an electromagnetic coil encompassing a portion of said displacement member, said coil being adapted for connection to a source of electrical power.

4. In combination
   (*a*) a housing defining a fluid chamber and a pressure port communicating with said fluid chamber,
   (*b*) a ferromagnetic displacement member carried in said housing,
   (*c*) means selectively operable to magnetize said displacement member,
   (*d*) an elongated resilient bow spring member carried in said fluid chamber,
   (*e*) means fixing the ends of said resilient bow spring member and at least one of said ends being operably connected to said displacement member whereby as magnetic force is applied to said displacement member dimensional changes produced in said displacement member will vary the space between said ends and urge said resilient bow spring member to move intermediate a straight and an arcuate position,
   (*f*) said pressure port being positioned to be engaged by said bow spring member when same is in one of said positions whereby movement toward the other of said positions by said bow spring member will variably open said pressure port.

References Cited in the file of this patent

UNITED STATES PATENTS

| | | |
|---|---|---|
| 2,585,863 | Smith | Feb. 12, 1952 |
| 2,764,647 | Leslie et al. | Sept. 25, 1956 |
| 2,897,312 | Ziegler | July 28, 1959 |
| 2,898,981 | Westbrook | Aug. 11, 1959 |
| 2,945,105 | Ingersoll | July 12, 1960 |
| 2,970,608 | Doeg | Feb. 7, 1961 |
| 3,069,916 | Watson | Dec. 25, 1962 |

FOREIGN PATENTS

| | | |
|---|---|---|
| 495,863 | Germany | Feb. 12, 1952 |